United States Patent [19]

Edmonds, Jr. et al.

[11] 4,451,643

[45] May 29, 1984

[54] PRODUCTION OF ARYLENE SULFIDE POLYMER BEADS

[75] Inventors: James T. Edmonds, Jr.; Fred T. Sherk, both of Bartlesville, Okla.

[73] Assignee: Phillips Petroleum Company, Bartlesville, Okla.

[21] Appl. No.: 456,185

[22] Filed: Jan. 6, 1983

[51] Int. Cl.³ ............................................. C08G 75/14
[52] U.S. Cl. ..................................... 528/387; 524/726
[58] Field of Search ......................... 528/387; 524/726

[56] References Cited

U.S. PATENT DOCUMENTS

| | | | |
|---|---|---|---|
| 3,884,884 | 5/1975 | Scoggins et al. | 260/79.1 |
| 4,024,118 | 5/1977 | Campbell et al. | 260/79.1 |
| 4,025,496 | 5/1977 | Anderson et al. | 260/79.1 |
| 4,038,263 | 7/1977 | Edmonds, Jr. et al. | 260/79.1 |
| 4,060,520 | 11/1977 | Irvin | 260/79.1 |

*Primary Examiner*—Melvyn I. Marquis

[57] ABSTRACT

A method for producing a polymer in which lithium hydroxide, optionally also employing either lithium chloride or lithium acetate, is contacted with N-methyl-pyrrolidone in the presence of lithium halide to produce a reaction product mixture containing lithium N-methyl-4-aminobutyrate with this reaction mixture then being contacted with hydrogen sulfide and polyhalo aromatic compound in the presence of additional N-methyl-pyrrolidone under conditions to form a polymer. Lithium halide produced as a by-product is substantially recovered from the reaction mixture, converted to lithium hydroxide and can be recycled to the process.

8 Claims, No Drawings

PRODUCTION OF ARYLENE SULFIDE POLYMER BEADS

BACKGROUND OF THE INVENTION

This invention relates to the production of arylene sulfide polymers. In one aspect the invention relates to the production of paraphenylene sulfide polymer (p-phenylene sulfide polymer) by reaction of lithium N-methyl-4-aminobutyrate in N-methyl-2-pyrrolidone with polyhalo-substituted aromatic compounds and hydrogen sulfide. In another of its aspects this invention relates to the production of p-phenylene sulfide polymer in the form of beads. In another of its aspects this invention relates to a process for the production of p-phenylene sulfide polymers in which one of the compounds produced in the reaction process as a by-product is recovered, reconverted to a compound suitable as a reactant in the process, and recycled to the reaction.

In U.S. Pat. No. 3,354,129, the disclosure of which is incorporated herein by reference, there is disclosed a method for producing polymers from polyhalo substituted aromatics, sulfur sources, and polar organic compounds. Since the initial discoveries that led to the disclosure in that patent there have been a myriad of improvements to the process described therein. The arylene sulfide polymers produced by these processes have been blended with fillers, pigments, extenders, other polymers and the like; have been cured through cross-linking and/or chain extension to provide cured products having high thermal stability and good chemical resistance and have proved useful in the production of coatings, films, molded objects, fibers and other finished items. Up to this time, however, the product recovered from the reaction mixture of the polymerization process and the production of arylene sulfide polymers has generally been reported to be a particulate material or powder. It has now been discovered, employing the method for producing arylene sulfide polymers set out in U.S. Pat. Nos. 3,884,884 and 4,060,520, that the polymerization reaction product can be readily recovered in bead or spherical form. The beaded product, which can be processed and used in the same manner as the powdered product, has important advantages from a processing standpoint since a bead form of product can be more readily handled than the previously produced fine powder.

It is therefore an object of this invention to provide a method for producing p-phenylene sulfide polymers in the form of beads.

Other aspects, objects and the various advantages of this invention will become apparent upon reading this specification and the appended claims.

STATEMENT OF THE INVENTION

According to this invention a method is provided for producing arylene sulfide polymer in bead form in which lithium N-methyl-4-aminobutyrate (LiMAB) is contacted with at least one polyhalo aromatic compound and hydrogen sulfide in the presence of N-methyl-2-pyrrolidone(NMP) under polymerization conditions which include agitation of the reaction mixture.

In one embodiment of the invention the LiMAB is present in a product mixture produced by the contacting of lithium hydroxide (LiOH) and NMP with the contacting materials in a ratio of NMP:LiOH of about 2:1 to about 2.5:1 and the hydrogen sulfide is then contacted with the product mixture in a ratio of initial NMP:hydrogen sulfide of about 4.5:1 to about 5:1 and an LiOH:hydrogen sulfide ratio of about 1.5:1 to about 2.5:1.

In another embodiment of the invention the LiMAB is present in a product mixture produced by contacting of NMP with a mixture of LiOH and a compound chosen from among lithium chloride (LiCl) and lithium acetate (LiOAc) in a ratio of the contacting compound of NMP:total Li of about 1.5:1 to about 2.1:1 and LiOH:LiCl or LiOH:LiOAc of about 4:1 to about 4.5:1 and the hydrogen sulfide is then contacted with the product mixture of initial NMP:hydrogen sulfide of about 4:1 to about 5.4:1 and total Li:hydrogen sulfide in a range of about 2.2:1 to about 2.8:1.

In the first embodiment, in which LiCl and LiOAc are not employed and only LiOH is initially present, close attention to mole ratios of the reactants is necessary. In this system, polymer beads are made when the mole ratios are: initial NMP:LiOH in a range of about 2 to about 2.5, preferably 2.25; initial NMP:H$_2$S in a range of about 4.5 to 5, preferably 4.7; and LiOH:H$_2$S in a range of about 1.5 to about 2.5, preferably about 2.1.

In the embodiment in which the LiMAB is produced by a reaction of NMP with a mixture of LiOH and either LiCl or LiOAc the mole ratios necessary for the production of bead-form product are: initial NMP:total lithium in a range of about 1.5 to about 2.1, preferably about 1.6 to about 2.05; initial NMP:H$_2$S in a range of about 4 to about 5.4, preferably of about 4.1 to about 5.3; LiOH:LiCl or LiOH:LiOAc in a range of about 4 to about 4.5; and total lithium:H$_2$S in a range of about 2.2 to about 2.8, preferably about 2.3 to about 2.6.

The lithium halides other than lithium chloride which can be employed in the process of this invention include lithium bromide, lithium iodide, and mixtures thereof. Lithium chloride is preferred because of its relatively low cost and ready availability. Lithium acetate has been found to be equally as useful as the lithium halides for employment along with lithium hydroxide in forming the aminobutyrate.

The polyhalo-substituted aromatic compounds which can be employed in the process of this invention are compounds wherein the halogen atoms are attached to aromatic ring carbon atoms. Suitable compounds include 1,2-dichlorobenzene, 1,3-dichlorobenzene, 1,4-dichlorobenzene and other polyhalo-substituted aromatic compounds described and exemplified the aforementioned U.S. Pat. No. 3,354,129. Mixtures of polyhalo-substituted aromatic compounds such as dihalo benzenes can be used, for example, a mixtue comprising at least one m-dihalobenzene and at least one p-dihalobenzene. Particularly preferred as reactants of this invention are p-dihalobenzenes. These compounds can be represented by the formula

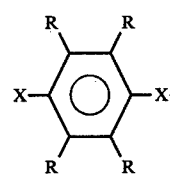

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromoenzene, p-diiodobenzene,- chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexy-3-dodecyl-2,5dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhalo aromatic compounds having more than two halogen substituents per molecule can also be employed in the process of this invention. These compounds can be represented by the formula $R'X_n$, where each X is selected from the group consisting of chlorine, bromine, and iodine, n is an integer of 3 to 6, and R' is a polyvalent aromatic radical of valence n which can have up to about four methyl substituents, the total number of carbon atoms in R' being within the range of 6 to about 16. For the purposes of this invention it has been found that the combination of both dihalobenzene and polyhalo aromatic compounds having more than two halogen substituents per molecule can enhance the desired result of producing a beaded product.

Examples of some polyhalo aromatic compounds having more than two halogen substituents per molecule which can be employed in the process of this invention include 1,2,3-trichlorobenzene, 1,2,4-trichlorobenzene, 1,2,4-triiodobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2', 6,6'-tetrabromo-3,3', 5,5'-tetramethylbiphenyl, 1,2, 3,4-tetrachloronaphthalene, 1,2,5,6-tetraiodonaphthalene, 1,2,4-tribromo-6-methylnaphthalene, and the like, and mixtures thereof.

The polymerization conditions employed in producing arylene sulfide polymers can be those well known in the art. Reaction temperatures can range from about 125° to 450° C., preferably from about 175° to about 350° C. The reaction time can range from about 10 minutes to about 3 days, preferably from about 1 hour to about 8 hours.

Agitation of the polymerization mixture is required to form the polymer beads as the polymerization progresses. Agitation of the mixture can be accomplished in various ways such as by stirring. A rate of stirring from about 50 to about 500 R.P.M. has been successfully used to provide beads.

Polymerization can be conducted in a continuous manner or batchwise by employing practices known in the art, e.g. the methods set out in U.S. Pat. No. 3,884,884 or 4,060,520, both incorporated here by reference. In either method, the reactor effluent can be flashed to remove NMP and the separated composition can be in turn washed with water to remove LiCl by-product. The aqueous salt-containing solution can be concentrated, if desired, and then treated at about 100° C. with sufficient sodium carbonate solution to precipitate lithium carbonate which can be separated. The separated lithium carbonate can be dissolved in water and treated at about 100° C. with calcium hydroxide to form lithium hydroxide as the double decomposition reaction proceeds. Lithium hydroxide monohydrate can be obtained from the solution by concentrating it, if desired. The lithium hydroxide chloride can then be recycled to the reactor.

In an alternative recovery process, the aqueous lithium chloride solution can be subjected to electrolysis to convert the salt to lithium hydroxide which is recovered and recycled to the reactor.

The examples that follow demonstrate the process of the present invention comparing those techniques which successfully produce bead-form polymer to those techniques that do not. The examples are meant to be illustrative and should not be taken as restrictive.

EXAMPLE 1

(Invention)

A stirred (about 300 RMP) stainless steel autoclave of 2 gal (7.6 L) capacity was charged, in order, with 3000 mL (31.1 moles, 3082 g) of N-methyl-2-pyrrolidone (NMP), 533 g (12.7 moles) of LiOH.H$_2$O and 127 g (3.02 moles) of LiCl. The autoclave was purged with nitrogen and the reaction mixture was dehydrated by heating it to 183° C. yielding 275 mL of water as distillate. To the hot residual mixture comprising a solution of LiMAB in NMP was then added 205.5 g (6.03 moles) of H$_2$S, 899.6 g (6.12 moles) of p-dichlorobenzene (DCB) and 500 mL (5.18 moles, 513 g) of NMP. The mixture was heated for 2 hours at 400° F. (204° C.) and then for 3.5 hours at 510° F. (265° C.) at pressures ranging from about 55 to 135 psia (379–930 kPa). The reaction mixture was then cooled and removed. The polymer formed was found to be in the form of small white beads (balls about 1 mm in diameter). The beads were washed with hot water and dried and found to weight 563.8 g. The ash content of the polymer was 0.81 wt% and its inherent viscosity was determined to be 0.17. The amount of LiCl based on the total weight of the reactants was 2.4 weight percent. The various calculated mole ratios are: initial NMP:H$_2$S of 5.16, DCB:H$_2$S of 1.01, LiOH:LiCl of 4.21, initial NMP:total lithium of 1.98 and total lithium (LiMAB): H$_2$S of 2.61.

EXAMPLE 2

(Control)

To the clean, stirred autoclave previously used was charged, as before, 3000 mL (31.1 moles) of NMP and 12.7 moles of LiOH.H$_2$O. After nitrogen purging, the mixture was dehydrated by heating to 183° C. yielding 240 mL of water as distillate. To the hot residual mixture was then added 205.2 g (6.02 moles) of H$_2$S, 899.6 g (6.12 moles) of NMP. As before the reaction was heated for 2 hours at 204° C. and 3.5 hours at 265° C. with the pressures ranging from 379–930 kPa. The recovered reaction product was found to contain irregularly shaped white particles but no beads. The washed particles after drying weighed 567.2 g. The ash content of the polymer was 0.45 wt % and its inherent viscosity was 0.17, the same as in Example 1. The various calculated mole ratios are: initial NMP:H$_2$S of 5.17, DCB:H$_2$S of 1.02, initial NMP:LiOH of 2.45 and LiOH:H$_2$S of 2.11.

EXAMPLE 3

(Control)

To the clean, stirred reactor as before was charged 3000 mL (31.1 moles) of NMP, 516.6 g (12.3 moles) of LiOH.H$_2$O, and 240.6 g (2.93 moles) of anhydrous sodium acetate (NaOAc). After nitrogen purging, the mixture was dehydrated by heating to 183° C. yielding 240 mL of water as distillate. To the hot residual mixture was then added 200.7 g (5.89 moles) of H$_2$S, 862.7 g (5.87 moles) of DCB and 500 mL of NMP. The reaction mixture was then heated for 2 hours at 204° C. and for 3 hours at 265° C. with the pressures ranging from about 60 to 155 psia (414–1070 K Pa). The recovered reaction product was found to contain generally irregular, globular shaped particles but no beads. The washed, dried product weight 455.9 g. The ash content of the polymer was 0.24 wt. %. The calculated mole ratios are: initial NMP:H$_2$S of 5.28, DCB:H$_2$S of 1.00, LiOH:NaOAc of 4.20, initial NMP:LiOH of 2.53, initial NMP:LiOH+NaOAc of 2.04, and LiOH:H$_2$S of 2.09 and total lithium+sodium: H$_2$S of 2.59. The results show that the substitution of sodium acetate for lithium chloride was not equivalent in this system and no polymer beads were produced.

EXAMPLE 4

(Invention)

To the clean, stirred reactor as before was charged 3000 mL of NMP, 516.6 g (12.3 moles) of LiOH.H$_2$O and 297 g (2.91 moles) of lithium acetate dihydrate (LiOAc.2H$_2$O). After nitrogen purging, the mixture was dehydrated by heating to 183° C. yielding 350 mL of water as distillate. To the hot residual mixture was then added 200.8 g (5.89 moles) of H$_2$S, 862.6 g (5.87 moles) of DCB and 500 mL of NMP. The reaction mixture was then heated for 2 hours at 204° C. and 3 hours at 265° C. with the pressures ranging from about 414 to 1,000 kPa. The recovered reaction product was found to be in the form of beads. The washed, dried product weighed 511.3 g and its ash content was 0.23 wt. %. The calculated amount of LiOAc used based on the total weight of the reactants is 3.6 wt %. The calculated mole ratios are: initial NMP:H$_2$S of 5.28, DCB:H$_2$S of 1.00, LiOH:LiOAc of 4.23, initial NMP:total lithium of 2.04 and total lithium:H$_2$S of 2.58. The results show that lithium acetate can be substituted for lithium chloride in the polymerization system and a polymer product in bead form can be recovered therefrom.

The following invention runs (5–8) illustrate some operabile mole ranges of components in which a bead-form polymer can be recovered from the reaction mixtures.

EXAMPLE 5

(Invention)

To the clean, stirred reactor as before was charged 3000 mL of NMP, 647.1 g (15.4 moles) of LiOH:H$_2$O and 162 g (3.82 moles) of LiCl. After purging with nitrogen, the mixture was dehydrated by heating to 183° C. yielding 330 mL of water. To the hot residual mixture was then added 258.8 g (7.59 moles) of H$_2$S, 1128 g (7.67 moles) of DCB and 500 mL of NMP. The reactor was heated in 2 stages as before with the pressures ranging from 379 to 1034 k Pa. The recovered polymer, in bead form, was washed and dried and found to weight 657.3 g. Its ash content was 0.99 wt. %. The amount of LiCl used based on the total weight of the reactants was 2.8 wt. %. The calculated mole ratios are: initial NMP:H$_2$S of 4.10, DCB:H$_2$S of 1.01, mole ratios are: initial NMP:H$_2$S of 4.10, DCB:H$_2$S of 1.01, LiOH:LiCl of 4.03, initial NMP: total lithium of 1.62 and total lithium: H$_2$S of 2.53.

EXAMPLE 6

(Invention)

To the clean, stirred reactor as before was charged 3000 mL of NMP, 645 g (15.4 moles) of LiOH.H$_2$O and 80 g (1.89 moles) of LiCl. After nitrogen purging, the mixture was dehydrated by heating to 183° C. yielding 300 mL of water. To the hot residual mixture was added 256.1 g (7.51 moles) of H$_2$S, 1113 g (7.57 moles) of DCB and 500 mL of NMP. The mixture was heated for 2 hours at 204° C. and for 3 hours, 35 minutes at 265° C. with the pressures ranging from about 379 to 1100 k Pa. The recovered product in bead form was washed, dried and weighed yielding 239.8 g. Its ash content was 0.71 wt % and its inherent viscosity was 0.14. The amount of LiCl used based on total reactants was 1.4 wt. %. The calculated mole ratios are: initial NMP:H$_2$S of 4.14, DCB:H$_2$S of 1.01, LiOH:LiCl of 8.15, initial NMP:total lithium of 1.80 and total lithium: H$_2$S of 2.30.

EXAMPLE 7

(Invention)

To the clean, stirred reactor as before was charged 3000 mL of NMP, 533 g (12.7 moles) of LiOH.H$_2$O and 127 g (3.02 moles) of LiCl. The mixture was dehydrated as before by heating to 183° C. yielding 245 mL of water. To the hot residual mixture was added 204.4 g (6.00 moles) of H$_2$S, 899.6 g (6.12 moles) of DCB, 15 g (0.08 mole) of 1,2,4-trichlorobenzene (TCB) and 500 mL of NMP. The mixture was heated as in Example 1. The recovered product in bead form was washed and dried. It was found to weight 538.5 g with an ash content of 0.90 wt. %. The amount of LiCl used based on total reactants was 2.4 wt. %. The calculated mole ratios are: initial NMP:H$_2$S of 5.18 DCB+TCB: H$_2$S of 1.03, LiOH: LiCl of 4.21, initial NMP:total lithium of 1.98 and total lithium:H$_2$S of 2.62. This run shows an arylene sulfide copolymer (containing a small amount of comomonomer, about 1.3 mole %) in bead form can be produced according to this invention.

EXAMPLE 8

(Invention)

To the clean, stirred reactor as before was charged 3000 mL of NMP, 533 g (12.7 moles) of LiOH.H$_2$O and 127 g (3.02) moles of LiCl. The mixture was dehydrated as before yielding 305 mL of water. To the hot residual mixture was added 205.1 g (6.02 moles) of H$_2$S, 720 g (4.90 moles) DCB, 197 g (1.22 moles) of 2,4-dichlorotoluene (DCT) and 500 mL of NMP. The mixture was heated for 2 hours at 204° C. and 3 hours at 265° C. with pressures ranging from about 379 to 1070 kPa. The recovered product in bead form was washed and dried. It weighed 546.3 g, its ash content was 0.88 wt % and its inherent visocisity was 0.06. The results show an arylene sulfide copolymer containing a relatively large amount of comonomer about 20 mole %, can be produced in bead form. The amount of LiCl used based on total reactants was about 2.4 wt %. The calculated mole ratios are initial NMP:$H_2S$ of 5.17, DCB+DCT:$H_2S$ of 1.01, LiOH:LiCl of 4.21, initial NMP:initial total lithium of 1.98 and total lithium:$H_2S$ of 2.61.

EXAMPLE 9

(Control)

To the clean, stirred reactor as before was charged 2500 mL (30.4 moles) of NMP, 2000 mL (110 moles) of cool boiled deionized water, 579.7 g (13.8 moles) of LiOH.$H_2O$ and 139 g (3.28 moles) of LiCl. The mixture was dehydrated as before yielding 2300 mL of water. To the hot residual mixture was added 224.4 g (6.58 moles) of $H_2S$, 967.9 g (6.58 moles) of DCB and 500 mL of NMP. The mixture was heated as described in Example 8 with similar pressures. The recovered granular product was washed an dried and found to weigh 577.9 g. Its ash content was 1.91 wt. %. The amount of LiCl used based on total reactants was about 2 wt. %. The total amount of water initially present as free water and hydrate water relative to LiOH is calculated to be about 9 moles water per mole LiOH which is outside of the scope of the invention. The other calculated mole ratios are: initial NMP:$H_2S$ of 4.62, DCB:$H_2S$ of 1.00; LiOH:LiCl of 4.21, initial NMP:total lithium of 1.78 and total lithium: $H_2S$ of 2.60.

EXAMPLE 10

(Control)

To the clean, stirred reactor as before was charged 2500 mL (30.4 moles) of NMP, 579.7 g (13.8 moles) of LiOH.$H_2O$ and 139 g (3.28 moles) of LiCl. The mixture was dehydrated as before yielding 260 mL of water. To the hot residual mixture was added 224.9 g (6.60 moles) of $H_2S$, 967.9 g (6.58 moles) of DCB and 500 mL of NMP. The mixture was heated as in Example 8 with similar pressures. The large particle size product (no beads) was washed, dried and found to weigh 576.4 g. Its ash content was 1.37 wt. %. The amount of LiCl used based on total reactants was about 2.8 wt. %. The calculated mole ratios are: initial NMP:$H_2S$ of 4:61, DCB:$H_2S$ of 1.00, LiOH:LiCl of 4.21, initial NMP:total lithium of 1.78 and total lithium:$H_2S$ of 2.59.

EXAMPLE 11

(Control)

To the clean, stirred reactor as before was added 3000 mL (31.1 moles) of NMP and 579.7 g (13.8 moles) of LiOH.$H_2O$. The mixture was dehydrated as before yielding 260 mL of water. To the hot residual mixture was added 224.9 g (6.60 moles) of $H_2S$, 967.9 g (6.58 moles) of DCB, 11.2 g (0.06 mole) of TCB and 500 mL of NMP. The mixture was heated as in Example 8 with similar pressures. The large particle size product (no beads) was washed, dried and found to weigh 630.4 g. Its ash content was 1.27 wt. %. The calculated ratios are: initial NMP:$H_2S$ of 4.71, DCB+TCB:$H_2S$ of 1.01, initial NMP:LiOH of 2.25 and LiOH:$H_2S$ of 2.09. This example is similar to that of Example 16 (invention run in that beads were produced) except that 0.02 mole less of TCB was employed. The reason for the failure to produce beads is not known.

EXAMPLE 12

(Control)

To the clean, stirred reactor as before was added 3000 mL (31.1 moles) of NMP and 516.6 g (12.3 moles) of LiOH.$H_2O$. The mixture was de hydrated as before yielding 240 mL of water. To the hot residual mixture was added 199.3 g (5.85 moles) of $H_2S$, 862.6 g (5.87 moles) of DCB and 500 mL of NMP. The mixture was heated as in Example 8 with similar pressures. The medium particle size product (no beads) was washed, dried adn found to weigh 523.4 g. Its ash content was 0.29 wt. %. The calculated mole ratios are: initial NMP:$H_2S$ of 5.57, DCB:$H_2S$ of 1.00, initial NMP:LiOH of 2.43 (out of scope of invention) and LiOH:$H_2S$ of 2.43.

The following runs exemplify the production of a bead form polymer in the presence of LiOH but absence of initially added LiCl.

EXAMPLE 13

(Invention)

To the clean, stirred reactor as before was added 3000 mL (31.1 moles) of NMP and 579.7 g (13.8 moles) of LiOH.$H_2O$. The mixture was dehydrated as before yielding 255 mL of water. To the hot residual mixture was added 223.9 g. (6.57 moles) of $H_2S$, 1006.5 g (6.85 moles) of DCB and 500 mL of NMP. The mixture was heated as in Example 8 with about the same pressures. The product comprising small beads was washed, dried and found to weight 652.1 g. Its ash content was 0.81 wt. %. The calculated mole ratios are: initial NMP:$H_2S$ of 4.71, DCB:$H_2S$ of 1.04; initial NMP:LiOH of 2.25 and LiOH:$H_2S$ of 2.10.

EXAMPLE 14

(Invention)

To the clean, stirred reactor as before was added 3000 mL (31.1 mole) of NMP and 579.7 g (13.8 moles) of LiOH.$H_2O$. The mixture was dehydrated as before yielding 260 mL of water. To the hot residual mixture was added 223.7 g (6.57 moles) of $H_2S$, 967.9 g (6.58 moles) of DCB and 500 mL of NMP. The mixture was heated as in Example 8 at about the same pressures. The product comprising small beads was washed, dried and found to weigh 615.6 g. Its ash content was 0.38 wt. %. The calculated mole ratios are: initial NMP:$H_2S$ of 4.73, DCB:$H_2S$ of 1.00, initial NMP:LiOH of 2.25 and LiOH:$H_2S$ of 2.10.

EXAMPLE 15

(Invention)

To the clean, stirred reactor as before was added 3000 mL (31.1 moles) of NMP and 579.7 g (13.8 moles) of LiOH.OH. The mixture was dehydrated as before yeilding 250 mL of water. To the hot residual mixture was added 225.4 g (6.61 moles) of $H_2S$, 967.9 g (6.58 moles) of DCB, 15 g (0.08 mole) of TCB and 500 mL of NMP. The mixture was heated as in Example 8 at about the same pressures. The product comprising small beads was washed, dried and found to weigh 637.0 g. Its ash content was 0.69 wt. %. The calculated mole ratios are: initial NMP:$H_2S$ of 4.70, DCB+TCB:$H_2S$ of 1.01, initial NMP:LiOH of 2.25 and LiOH:$H_2S$ of 2.09.

EXAMPLE 16

(Invention)

To the clean, stirred reactor as before was added 3000 mL (31.1 moles) of NMP and 579.7 g (13.8 moles) of LiOH.$H_2O$. The mixture was dehydrated as before yielding 265 mL of water. To the hot residual mixture was added 224.9 g (6.60 moles) of H₂S, 967.9 g (6.58 moles) of DCB, 7.5 g (0.04 mole) of TCB and 500 mL of NMP. The mixture was heated as in Example 8 at about the same pressures. The product comprising small beads was washed, dried and found to weigh 629.6 g. Its ash content was 0.49 wt. %. The calculated mole ratios are: initial NMP:H₂S of 4.71, DCB+TCB:H₂S of 1.00, initial NMP:LiOH of 2.25 and LiOH:H₂S of 2.09.

We claim:

1. A method for producing arylene sulfide polymer in bead form comprising contacting lithium N-methyl-4-aminobutyrate (LiMAB) with at least one polyhalo aromatic compound and hydrogen sulfide (H₂S) in the presence of n-methyl-2-phrrolidone (NMP) under polymerization conditions including agitation of the reaction mixture wherein said LiMAB is present in a product mixture produced by the contacting of LiOH with NMP with the contacting compounds in a ratio of NMP:LiOH of about 2:1 to about 2.5:1 and said H₂S is then contacted with the product mixture in a ratio of initial NMP:H₂S of about 4.5:1 to about 5:1 and an LiOH:H₂S ratio of about 1.5:1 to about 2.5:1.

2. A method for producing arylene sulfide polymer in bead form comprising contacting lithium N-methyl-4-aminobutyrate (LiMAB) with at least one polyhalo aromatic compound and hydrogen sulfide (H₂S) in the presence of n-methyl-2-phrrolidone (NMP) under polymerization conditions including agitation of the reaction mixture wherein said LiMAB is present in a product mixture produced by contacting of NMP with a mixture of LiOH and a compound chosen from among lithium chloride (liCl) and lithium acetate (LiOAc) in a ratio of contacting compounds of NMP:total Li of about 1.5:1 to about 2.1:1 and LiOH:LiCl or LiOH:LiOAc of about 4:1 to about 4.5:1 and said H₂S is then contacted with the product mixture in a ratio of initial NMP:H₂S of about 4:1 to about 5.4:1 and total Li:H₂S in a range of about 2.2:1 to about 2.8:1.

3. A method of claim 1 wherein more than one polyhalo aromatic compound chosen from among dihalo aromatic compounds and polyhalo aromatic compounds having more than two halogen constituents are present in the polymerization reaction.

4. A method of claim 2 wherein more than one compound chosen from among dihalo aromatic compounds and polyhalo aromatic compounds having more than two halogen constituents are present in the polymerization reaction.

5. A method of claim 1 wherein a lithium halide by-product is recovered from the reaction mixture and is converted to LiOH for recycle to the reaction.

6. A method of claim 2 wherein a lithium halide by-product is recovered from the reaction mixture and is converted to LiOH for recycle to the reaction.

7. A method of claim 1 comprising a further step of recovering the polymer produced from the polymerization reaction mixture.

8. A method of claim 2 comprising a further step of recovering the polymer produced from the polymerization reaction mixture.

* * * * *